United States Patent
Li et al.

(10) Patent No.: US 9,690,951 B2
(45) Date of Patent: *Jun. 27, 2017

(54) METHOD, DEVICE AND SYSTEM FOR FORWARDING DOCUMENT CONTENT IN EXTENSIBLE MARKUP LANGUAGE DOCUMENT MANAGEMENT

(71) Applicant: Huawei Device Co., Ltd., Shenzhen, Guangdong (CN)

(72) Inventors: Xiaojuan Li, Beijing (CN); Yue Song, Shenzhen (CN); Haitao Liu, Beijing (CN); Xinmiao Chang, Beijing (CN); Huiping Zhang, Shenzhen (CN)

(73) Assignee: Huawei Device Co., Ltd., Shenzhen (CN)

(*) Notice: Subject to any disclaimer, the term of this patent is extended or adjusted under 35 U.S.C. 154(b) by 357 days.

This patent is subject to a terminal disclaimer.

(21) Appl. No.: 14/498,636

(22) Filed: Sep. 26, 2014

(65) Prior Publication Data
US 2015/0013020 A1    Jan. 8, 2015

Related U.S. Application Data

(63) Continuation of application No. 13/422,469, filed on Mar. 16, 2012, now Pat. No. 8,880,643, which is a (Continued)

(30) Foreign Application Priority Data

Sep. 16, 2009    (CN) .......................... 2009 1 0093226

(51) Int. Cl.
    *G06F 15/16*    (2006.01)
    *G06F 21/62*    (2013.01)
    (Continued)

(52) U.S. Cl.
    CPC .... *G06F 21/6218* (2013.01); *G06F 17/30941* (2013.01); *G06F 21/10* (2013.01);
    (Continued)

(58) Field of Classification Search
    CPC ....... H04L 67/02; H04L 12/58; H04L 12/589; H04L 12/5895; H04L 51/00;
    (Continued)

(56) References Cited

U.S. PATENT DOCUMENTS

| 7,373,330 B1 | 5/2008 | Klebe |
| 8,639,763 B2 | 1/2014 | Petronijevic et al. |

(Continued)

FOREIGN PATENT DOCUMENTS

| CN | 1288200 A | 3/2001 |
| CN | 101026493 A | 8/2007 |

(Continued)

OTHER PUBLICATIONS

U.S. Appl. No. 13/422,469, Mar. 16, 2012.
(Continued)

*Primary Examiner* — Zarni Maung
(74) *Attorney, Agent, or Firm* — Leydig, Voit & Mayer, Ltd.

(57) ABSTRACT

In the field of mobile communications, embodiments of the present invention disclose a method, a device and a system for forwarding document content in Extensible Markup Language Document Management (XDM). The method includes: receiving a forwarding request sent by a forwarding sender, where the forwarding request is used to forward the document content to a forwarding receiver; judging, according to a rights document, whether the forwarding sender has a forwarding right to the document content and whether the forwarding receiver has an access right to the document content; and when the forwarding sender has the forwarding right and the forwarding receiver has the access right, forwarding the document content to the forwarding (Continued)

receiver. Through the solutions in the embodiments of the present invention, the forwarding sender selectively forwards the document content to the forwarding receiver according to the rights document stored in an XDM Server (XDMS).

18 Claims, 7 Drawing Sheets

Related U.S. Application Data continuation of application No. PCT/CN2010/076987, filed on Sep. 16, 2010.

(51) Int. Cl.

| | | |
|---|---|---|
| *H04L 29/08* | (2006.01) | |
| *G06F 17/30* | (2006.01) | |
| *G06F 21/10* | (2013.01) | |
| *G06F 21/60* | (2013.01) | |
| *H04L 12/64* | (2006.01) | |
| *H04L 12/66* | (2006.01) | |
| *H04L 29/06* | (2006.01) | |
| *G06F 12/00* | (2006.01) | |

(52) U.S. Cl.
CPC ........ *G06F 21/606* (2013.01); *H04L 12/6418* (2013.01); *H04L 12/66* (2013.01); *H04L 29/08072* (2013.01); *H04L 63/10* (2013.01); *H04L 67/10* (2013.01)

(58) Field of Classification Search
CPC ... H04L 51/066; H04L 51/36; H04L 65/1006; H04L 67/24; H04L 67/2804; H04L 12/6418; H04L 12/66; H04M 2203/4509; H04M 3/5307; H04W 4/12; H04W 80/10; H04W 92/02
USPC ................. 709/203, 217–219, 223–229, 250
See application file for complete search history.

(56) References Cited

U.S. PATENT DOCUMENTS

| | | | | |
|---|---|---|---|---|
| 8,718,118 B2* | 5/2014 | Tzannes | ................... | H04L 7/042 370/465 |
| 8,880,643 B2* | 11/2014 | Li | ........................... | H04L 12/66 709/217 |
| 2002/0065895 A1 | 5/2002 | Zhang et al. | | |
| 2007/0255714 A1 | 11/2007 | Laurila et al. | | |
| 2008/0249997 A1 | 10/2008 | Sun et al. | | |
| 2009/0193483 A1 | 7/2009 | Hwang et al. | | |
| 2010/0275115 A1 | 10/2010 | Oh et al. | | |
| 2011/0214051 A1 | 9/2011 | Petronijevic et al. | | |
| 2012/0179852 A1* | 7/2012 | McEvoy | ............. | H04L 63/0209 710/310 |

FOREIGN PATENT DOCUMENTS

| | | |
|---|---|---|
| CN | 101051937 A | 10/2007 |
| CN | 101506799 A | 8/2009 |
| WO | WO 2007049928 A1 | 5/2007 |
| WO | WO 2008020720 A1 | 2/2008 |
| WO | WO 2011032501 A1 | 3/2011 |

OTHER PUBLICATIONS

"XML Document Management (XDM) Specification" OMA-TS-XDM_Core-V2_1-20090903-D, Draft Version 2.1, pp. 1-85, Open Mobile Alliance, San Diego, California (Sep. 3, 2009).

Lindgren, "Doc# OMA-PAG-2009-0194R01_XDM_2.1_Core_AccessPermissions.," Change Request, pp. 1-4, Open Mobile Alliance, San Diego, California (Jun. 22, 2009).

"XML Document Management (XDM) Specification," pp. 1-80, Candidate Version 2.0 OMA-TS-XDM_Core-V2_0-20090810-C, Open Mobile Alliance, San Diego, California (Aug. 10, 2009).

Rosenberg, "The Extensible Markup (XML) Language Configuration Access Protocol (XCAP)," Network Working Group, pp. 1-71, Internet Society, Reston, Virginia (May 2007).

Office Action in corresponding U.S. Appl. No. 13/422,469 (Mar. 3, 2014).

Written Opinion of the International Searching Authority in corresponding PCT Patent Application No. PCT/CN2010/076987 (Dec. 30, 2010).

Office Action in corresponding Chinese Patent Application No. 200910093226.X (Mar. 23, 2012).

Extended European Search Report in corresponding European Patent Application No. 10816705.7 (May 22, 2012).

Office Action in corresponding Chinese Patent Application No. 200910093226.X (Dec. 20, 2012).

* cited by examiner

METHOD, DEVICE AND SYSTEM FOR FORWARDING DOCUMENT CONTENT IN EXTENSIBLE MARKUP LANGUAGE DOCUMENT MANAGEMENT

CROSS-REFERENCE TO RELATED APPLICATIONS

This application is a continuation of U.S. patent application Ser. No. 13/422,469, filed Mar. 16, 2012, which is a continuation of International Patent Application No. PCT/CN2010/076987, filed Sep. 16, 2010. The International Application claims priority to Chinese Patent Application No. 200910093226.X, filed Sep. 16, 2009. The afore-mentioned patent applications are hereby incorporated by reference in their entireties.

FIELD OF THE INVENTION

The present invention relates to the communications field, and in particular, to a method, a device and a system for forwarding document content in Extensible Markup Language (XML) Document Management (XDM).

BACKGROUND OF THE INVENTION

XDM is a general mechanism for generating information related to user specific services such as Presence, push to talk over cellular (PoC) and Instant Message (IM), and the specific service information is stored at a network side, and may be accessed and processed by an authorized user. In the XDM, how the specific service information is defined as Extensible Markup Language (XML) documents and a general protocol for accessing and processing these XML documents are described in detail.

A document that is accessed and processed through an XML Configuration Protocol (XCAP) of the XDM is stored in a logic storage library XDM Server (XDMS) in a network. Different users have different access rights to the same document, and the access rights of these users are administered by an administrator, where the administrator is a special user that is authorized to modify an access right of a document, and a user may access all documents or a part of the documents in the XDMS according to the access right set by the administrator.

In a current XDM, a right of a forwarding receiver is not set; in this case, a forwarding sender can arbitrarily forward a document after having a forwarding right. After receiving the document sent by the forwarding sender, the forwarding receiver may not only watch the document content, but also has the same right as a document management user; in this case, the document management user cannot perform safe and effective management on the document, which is against a will of the document management user.

SUMMARY OF THE INVENTION

In order to enable a forwarding sender to selectively forward document content to a forwarding receiver according to a rights setting in an access rights document stored in an XDMS, so as to avoid arbitrary forwarding of a document after the forwarding sender has a forwarding right, and ensure confidentiality of the document for a document creator, embodiments of the present invention provides a method, a device and a system for forwarding document content in XDM. The solutions are as follows:

An embodiment of the present invention provides a method for forwarding document content in XDM, where the method includes:
  receiving a forwarding request sent by a forwarding sender, where the forwarding request is used to forward the document content to a forwarding receiver;
  judging, according to a rights document, whether the forwarding sender has a forwarding right to the document content and whether the forwarding receiver has an access right to the document content; and
  when the forwarding sender has the forwarding right and the forwarding receiver has the access right, forwarding the document content to the forwarding receiver.

An embodiment of the present invention further provides an XDMS device, where the device includes:
  a receiving module, configured to receive a forwarding request sent by a forwarding sender, where the forwarding request is used to forward document content to a forwarding receiver;
  a judging module, configured to judge, according to a rights document, whether the forwarding sender has a forwarding right to the document content and whether the forwarding receiver has an access right to the document content; and
  a forwarding module, configured to forward the document content to the forwarding receiver when the forwarding sender has the forwarding right and the forwarding receiver has the access right.

An embodiment of the present invention further provides a system for forwarding document content in XDM, where the system includes an XDMS and an XDM client (XDMC).

The XDMS is configured to receive a forwarding request sent by a forwarding sender, where the forwarding request is used to forward the document content to a forwarding receiver; judge, according to a rights document, whether the forwarding sender has a forwarding right to the document content and whether the forwarding receiver has an access right to the document content; and when the forwarding sender has the forwarding right and the forwarding receiver has the access right, forward the document content to the forwarding receiver.

The XDMC is configured to send the forwarding request to the XDMS, where the forwarding request is used to forward the document content to the forwarding receiver.

The embodiments of the present invention have the following beneficial effects:

In the methods according to the embodiments of the present invention, the XDMS sets the forwarding right of the forwarding sender and at the same time sets the access right of the forwarding receiver, or asks a document administrator the forwarding right of the forwarding sender and the access right of the forwarding receiver after receiving the forwarding request, so that the forwarding sender can selectively forward the document content to the forwarding receiver according to the rights setting in the access rights document stored in the XDMS, thereby avoiding arbitrary forwarding of the document after the forwarding sender has the forwarding right and ensuring the confidentiality of the document for the document creator.

BRIEF DESCRIPTION OF THE DRAWINGS

To illustrate the technical solutions according to the embodiments of the present invention or in the prior art more clearly, the accompanying drawings required for describing the embodiments or the prior art are briefly introduced below. Apparently, the accompanying drawings in the following descriptions merely show some of the embodiments of the present invention, and persons of ordinary skill in the art may obtain other drawings according to the accompanying drawings without creative efforts.

DETAILED DESCRIPTION OF THE EMBODIMENTS

In order to make the objectives, technical solutions and advantages of the present invention more comprehensible, the present invention is described in further detail below with reference to the accompanying drawings.

Embodiment 1

Figure 1:
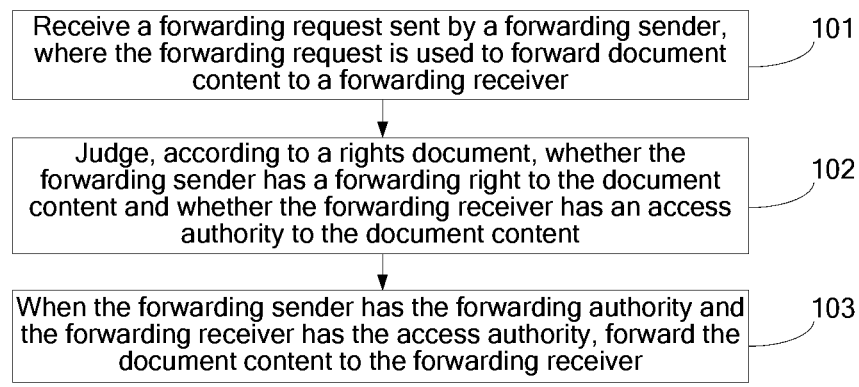
FIG. 1 is a flow chart of a method according to Embodiment 1 of the present invention.

This embodiment of the present invention provides a method for forwarding document content in XDM. Referring to FIG. 1, the method includes:

101: Receive a forwarding request sent by a forwarding sender, where the forwarding request is used to forward the document content to a forwarding receiver.

102: Judge, according to a rights document, whether the forwarding sender has a forwarding right to the document content and whether the forwarding receiver has an access right to the document content.

103: When the forwarding sender has the forwarding right and the forwarding receiver has the access right, forward the document content to the forwarding receiver.

Before receiving the forwarding request sent by the forwarding sender, the method further includes:
  setting, in the rights document, the forwarding right of the forwarding sender, and setting a forwarding receiver list of the forwarding sender; or
  setting, in the rights document, the forwarding right of the forwarding sender, and setting, in the rights document, the access right of the forwarding receiver.
Alternatively,
  before receiving the forwarding request sent by the forwarding sender, the method further includes:
  setting, in the rights document, the forwarding right of the forwarding sender; or
  setting, in the rights document, the forwarding right of the forwarding sender, and setting a prohibited forwarding receiver list of the forwarding sender.

When the method includes setting, in the rights document, the forwarding right of the forwarding sender and setting the forwarding receiver list of the forwarding sender, the setting the forwarding receiver list of the forwarding sender specifically includes:
  extending a sub-element under a forwarding operation element (corresponding to an <allow-forwarding> element in the rights document) in an action element (corresponding to an <actions> element in the rights document), where the extended sub-element is used to set the forwarding receiver list;
  setting a forwarding sender list and the forwarding receiver list respectively under a condition element (corresponding to a <conditions> element in the rights document); or
  setting the forwarding sender list and the forwarding receiver list under different condition elements respectively, and associating a forwarding sender with a forwarding receiver.

When the method includes setting, in the rights document, the forwarding right of the forwarding sender and setting the prohibited forwarding receiver list of the forwarding sender, the setting the prohibited forwarding receiver list specifically includes:
  extending a sub-element under a forwarding operation element (corresponding to an <allow-forwarding> element in the rights document) in an action element (corresponding to an <actions> element in the rights document), where the extended sub-element is used to set the prohibited forwarding receiver list;
  setting a forwarding sender list and the prohibited forwarding receiver list respectively under a condition element (corresponding to a <conditions> element in the rights document); or
  setting the forwarding sender list and the prohibited forwarding receiver list under different condition elements respectively, and associating a forwarding sender and a prohibited forwarding receiver.

When the method includes setting, in the rights document, the forwarding right of the forwarding sender and setting the forwarding receiver list of the forwarding sender,
  the setting, in the rights document, the forwarding right of the forwarding sender further includes:
  setting document content to which the forwarding sender has the forwarding right, and setting received document content of the forwarding receiver, where the received document content includes a part of the document content or the whole document content to which the forwarding sender has the forwarding right.

When the method includes setting, in the rights document, the forwarding right of the forwarding sender, and setting, in the rights document, the access right of the forwarding receiver,
  the setting, in the rights document, the forwarding right of the forwarding sender further includes:
  setting document content to which the forwarding sender has the forwarding right and setting document content to which the forwarding receiver has the access right.

When the method includes setting, in the rights document, the forwarding right of the forwarding sender,
  the setting, in the rights document, the forwarding right of the forwarding sender further includes:
  setting document content to which the forwarding sender has the forwarding right.

When the method includes setting, in the rights document, the forwarding right of the forwarding sender and setting the prohibited forwarding receiver list of the forwarding sender,
  the setting, in the rights document, the forwarding right of the forwarding sender further includes:
  setting document content to which the forwarding sender has the forwarding right.

When the method includes setting, in the rights document, the forwarding right of the forwarding sender, the judging, according to the rights document, whether the forwarding sender has the forwarding right to the document content and whether the forwarding receiver has the access right to the document content specifically includes:

acquiring, from the rights document, the access right of the forwarding sender to the document content, and judging whether the forwarding sender has the forwarding right to the document content;

when the forwarding sender has the forwarding right, sending an asking request to an XDMC of a document management user, and asking whether the forwarding receiver has the access right to the document content; and receiving an asking result returned by the XDMC of the document management user, where when the query result is yes, the forwarding receiver has the access right to the document content.

The judging, according to the rights document, whether the forwarding sender has the forwarding right to the document content and whether the forwarding receiver has the access right to the document content further includes:

after receiving the forwarding request sent by the forwarding sender, acquiring the forwarding right of the forwarding sender in the rights document, if the rights document does not include the forwarding right of the forwarding sender, sending the asking request to the XDMC of the document management user, and asking whether the forwarding sender has the forwarding right to the document content and whether the forwarding receiver has the access right to the document content; and receiving the asking result returned by the XDMC of the document management user.

In the method according to this embodiment of the present invention, the XDMS sets the forwarding right of the forwarding sender and at the same time sets the access right of the forwarding receiver, or asks a document administrator the forwarding right of the forwarding sender and the access right of the forwarding receiver after receiving the forwarding request, so that the forwarding sender can selectively forward the document content to the forwarding receiver according to a rights setting in an access rights document stored in the XDMS, thereby avoiding arbitrary forwarding of the document after the forwarding sender has the forwarding right, and ensuring confidentiality of the document for a document creator.

Embodiment 2

Figure 2:
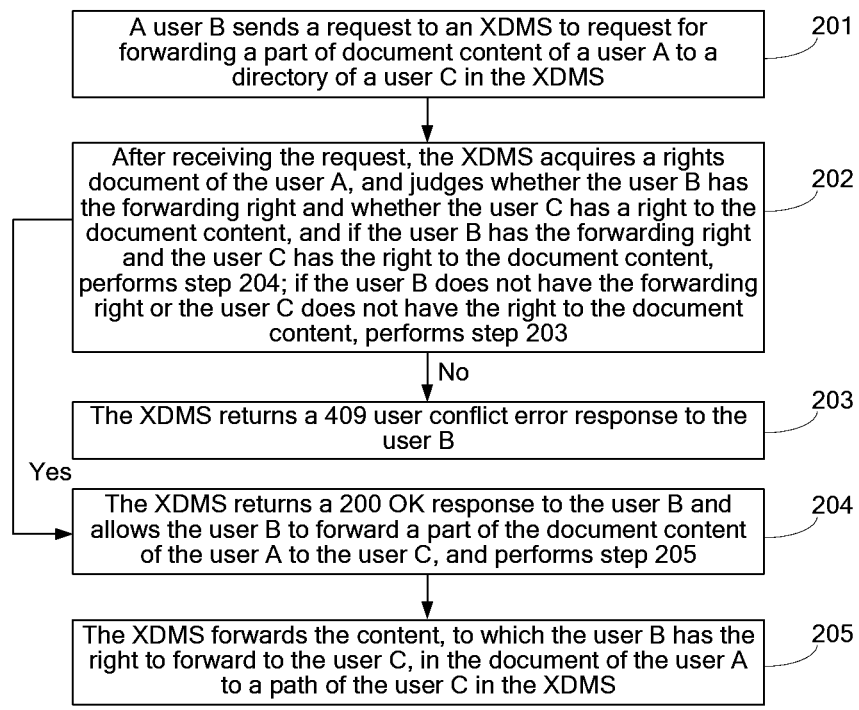
FIG. 2 is a flow chart of a method according to Embodiment 2 of the present invention.

In order to enable a forwarding sender to selectively forward document content to a forwarding receiver according to a rights setting in an access rights document stored in an XDMS, so as to avoid arbitrary forwarding of a document after the forwarding sender has a forwarding right, and ensure confidentiality of the document for a document creator, this embodiment of the present invention provides a method for forwarding document content in XDM. The specific content is as follows:

In the method for selectively forwarding content to the forwarding receiver in the XDM according to this embodiment of the present invention, two methods may be adopted for selective forwarding: One method is setting, in an access right, a Uniform Resource Identifier (URI) of a forwarding receiver for a forwarding sender having the forwarding right, and at the same time, setting forwarding times; the other method is sending the URI of the forwarding receiver to the XDMS when the forwarding sender having the forwarding right sends a document, and authenticating, by the XDMS in the access rights document, whether the URI has a right of accessing the document content. Taking that a user A is the document management user, a user B is the forwarding sender, and a user C is the forwarding receiver as an example, referring to FIG. 2, the specific process is as follows:

201: The user B sends a request to the XDMS to request for forwarding a part of document content of the user A to a directory of the user C in the XDMS.

In this embodiment of the present invention, the user A is the document management user, the user B is the forwarding sender, and the user C is the forwarding receiver. The user B requests for forwarding a part of the document content of the user A to the directory of the user C in the XDMS; as the document management user, the user A may be a creator of an XML document, or may be a special user that is authorized and can modify the access right of the document, and another user may access the whole document or a part of the document content in the XDMS according to the access right set by the administrator user A.

The user B is located at an XDMC, and sends a request to the XDMS to request for forwarding a part of the document content of the user A to the directory of the user C in the XDMS, or request for forwarding the whole document content of the user A to the user C, provided that the user B has a right of forwarding the whole document content.

202: After receiving the request, the XDMS acquires the rights document of the user A, and judges whether the user B has the forwarding right and whether the user C has the right to the document content. If the user B has the forwarding right and the user C has the right to the document content, step 204 is performed; if the user B does not have the forwarding right or the user C does not have the right to the document content, step 203 is performed.

After the XDMS receives the request, first, acquire an access rights document of the user A in the XDMS, and check whether the user B has the forwarding right in the access rights document; secondly, when the user B has the access right, acquire whether the user B can forward the document content to which the user B has the right to the user C, where a forwarding procedure is forwarding the content, which the user B can access, of the user A in the XDMS to a path of the user C in the XDMS, instead of forwarding to the XDM user C of the user C.

Specifically, two storage and setting methods exist for storing and setting the forwarding right of the user B in the access rights document of the user A and whether the user B can forward to the user C.

(1) When that the user B has the forwarding right is set in the rights document of the user A, the forwarding receiver to which the user B can forward is also set. If the forwarding receiver of the user B in the rights document of the user A does not include the user C, the XDMS performs step 203; if the forwarding receiver of the user B in the rights document of the user A includes the user C, the XDMS performs step 204.

When the forwarding receiver to which the user B can forward the document content is set, the forwarding times of the user B may also be set to limit the user B; and forwarding content of the user B may also be set, that is, the user B has the forwarding right to the document, but may have the forwarding right of only a part of the content of the document, so that the user B can forward only the part of the content to which the user B has the forwarding right; similarly, receiving content of the user C may also be set, where the receiving content may be the part of the document content to which the user B has the forwarding right and may also be the whole document content to which the user B has the forwarding right.

The following six methods exist for setting the forwarding receiver in the access rights document:

<I> Add a sub-element <receipt> under the forwarding operation <allow-forwarding> element in the action <actions> element to represent an allowed receiver of the forwarding.

For example: <document-rule path="/group1">

```
<cp:ruleset>
    <cp:rule cp:id="a1">
        <cp:conditions>
            <is-member/>
            <paths>
                <path id="group/listservice/list"/>
                <path id="group/listservice/subject"/>
                <path id="group/listservice/schedule"/>
            </paths>
        </cp:conditions>
        <cp:actions>
            <allow-forwarding attribute="true">
                <receipt>
                    <identity>
                        <one uri="sip:bob@example"/>
                        <one uri="sip:alice@example"/>
                    </identity>
                </receipt>
            </allow-forwarding>
        </cp:actions>
    </cp:rule>
</cp:ruleset>
</document-rule>
```

<II> Add a sub-element <non-receipt> under the forwarding operation <allow-forwarding> element in the action <actions> element to represent a prohibited receiver.

For example: <document-rule path="/group1">

```
<cp:ruleset>
    <cp:rule cp:id="a1">
        <cp:conditions>
            <is-member/>
            <paths>
                <path id="group/listservice/list"/>
                <path id="group/listservice/subject"/>
                <path id="group/listservice/schedule"/>
            </paths>
        </cp:conditions>
        <cp:actions>
            <allow-forwarding attribute="true">
                <non-receipt>
                    <identity>
                        <one uri="sip:david@example"/>
                        <one uri="sip:tom@example"/>
                    </identity>
                </non-receipt>
            </allow-forwarding>
        </cp:actions>
    </cp:rule>
</cp:ruleset>
</document-rule>
```

<III> Define the forwarding receiver and the forwarding sender under the condition <conditions> element, that is, under the <conditions> element, define two sub-elements <sender> and <receipt> to describe the forwarding sender and the forwarding receiver respectively.

For example,

```
<document-rule path="/group1">
    <cp:ruleset>
        <cp:rule cp:id="a1">
            <cp:conditions>
                <sender>
                    <is-member/>
                </sender>
                <receipt>
                    <identity>
                        <one uri="bob@example.com"/>
                        <one uri="alice@example.com"/>
                    </identity>
                </receipt>
                <paths>
                    <path id="group/listservice/list"/>
                    <path id="group/listservice/subject"/>
                    <path id="group/listservice/schedule"/>
                </paths>
            </cp:conditions>
            <cp:actions>
                <allow-forwarding>true</allow-forwarding>
            </cp:actions>
        </cp:rule>
    </cp:ruleset>
</document-rule>
```

<IV> Define the prohibited receiver and an allowed sender under the condition <conditions> element, that is, under the <conditions> element, define two sub-elements <sender> and <receipt> to describe the allowed sender and the prohibited receiver.

For example,

```
<document-rule path="/group1">
    <cp:ruleset>
        <cp:rule cp:id="a1">
            <cp:conditions>
                <sender>
                    <is-member/>
                </sender>
                <non-receipt>
                    <identity>
                        <one uri="david@example.com"/>
                        <one uri="tom@example.com"/>
                    </identity>
                </non-receipt>
                <paths>
                    <path id="group/listservice/list"/>
                    <path id="group/listservice/subject"/>
                    <path id="group/listservice/schedule"/>
                </paths>
            </cp:conditions>
            <cp:actions>
                <allow-forwarding>true</allow-forwarding>
            </cp:actions>
        </cp:rule>
    </cp:ruleset>
</document-rule>
```

<V> Define the forwarding receiver and the forwarding sender under different <conditions> elements, and associate the forwarding sender with the forwarding receiver. That is, define <sender> under one <conditions>, and define <receipt> under another <conditions>. Two methods exist for associating the forwarding sender with the forwarding receiver: One method is performing the association by using an attribute value id of <rule>, and if id values are the same, it is proved that the forwarding sender and the forwarding receiver are under the same forwarding operation; the other method is associating the forwarding receiver when defining the forwarding sender under the <conditions> element.

Example 1

```
<document-rule path="/group1">
  <cp:ruleset>
    <cp:rule cp:id=>
      <cp:conditions>
        <sender>
          <is-member/>
        </sender>
        <paths>
          <path id="group/listservice/list"/>
          <path id="group/listservice/subject"/>
          <path id="group/listservice/schedule"/>
        </paths>
      </cp:conditions>
      <cp:actions>
        <allow-forwarding>true</allow-forwarding>
      </cp:actions>
    </cp:rule>
    <cp:rule cp:id="a1">
      <cp:conditions>
        <receipt>
          <identity>
            <one uri="david@example.com"/>
            <one uri="tom@example.com"/>
          </identity>
        </receipt>
        <paths>
          <path id="group/listservice/list"/>
          <path id="group/listservice/subject"/>
          <path id="group/listservice/schedule"/>
        </paths>
      </cp:conditions>
      <cp:actions>
        <allow-forwarding>true</allow-forwarding>
      </cp:actions>
    </cp:rule>
  </cp:ruleset>
</document-rule>
```

Example 2

```
<document-rule path="/group1">
<cp:ruleset>
  <cp:rule cp:id="a1">
    <cp:conditions>
      <sender>
        <is-member/>
      </sender>
      <external="/rule@id=a2"/>
      <paths>
        <path id="group/listservice/list"/>
        <path id="group/listservice/subject"/>
        <path id="group/listservice/schedule"/>
      </paths>
    </cp:conditions>
    <cp:actions>
      <allow-forwarding>true</allow-forwarding>
    </cp:actions>
  </cp:rule>
  <cp:rule cp:id="a2">
    <cp:conditions>
      <receipt>
        <identity>
          <one uri="bob@example.com"/>
          <one uri="alice@example.com"/>
        </identity>
      </receipt>
      <paths>
        <path id="group/listservice/list"/>
        <path id="group/listservice/subject"/>
        <path id="group/listservice/schedule"/>
      </paths>
    </cp:conditions>
```

```
      <cp:actions>
        <allow-forwarding>true</allow-forwarding>
      </cp:actions>
    </cp:rule>
  </cp:ruleset>
</document-rule>
```

<VI> Define the forwarding receiver and the forwarding sender under different <conditions> elements, and associate the forwarding sender with the forwarding receiver. That is, define the <sender> under one <conditions>, and define the <non-receipt> (this element is used to represent a principal of prohibited receiving) under another <conditions>. Two methods exist for associating the forwarding sender with the forwarding receiver: One method is performing the association by using an attribute value id of <rule>, and if id values are the same, it is proved that the forwarding sender and the forwarding receiver are under the same forwarding operation; the other method is associating the forwarding receiver when defining the forwarding sender under the <conditions> element.

Example 1

```
<document-rule path="/group1">
  <cp:ruleset>
    <cp:rule cp:id="a1">
      <cp:conditions>
        <sender>
          <is-member/>
        </sender>
        <paths>
          <path id="group/listservice/list"/>
          <path id="group/listservice/subject"/>
          <path id="group/listservice/schedule"/>
        </paths>
      </cp:conditions>
      <cp:actions>
        <allow-forwarding>true</allow-forwarding>
      </cp:actions>
    </cp:rule>
    <cp:rule cp:id="a1">
      <cp:conditions>
        <non-receipt>
          <identity>
            <one uri="david@example.com"/>
            <one uri="tom@example.com"/>
          </identity>
        </non-receipt>
        <paths>
          <path id="group/listservice/list"/>
          <path id="group/listservice/subject"/>
          <path id="group/listservice/schedule"/>
        </paths>
      </cp:conditions>
      <cp:actions>
        <allow-forwarding>true</allow-forwarding>
      </cp:actions>
    </cp:rule>
  </cp:ruleset>
</document-rule>
```

Example 2

```
<document-rule path="/group1">
  <cp:ruleset>
    <cp:rule cp:id="a1">
```

-continued

```
    <cp:conditions>
        <sender>
            <is-member/>
        </sender>
        <non-receipt external="/rule@id=a2"/>
            <paths>
                <path id="group/listservice/list"/>
                <path id="group/listservice/subject"/>
                <path id="group/listservice/schedule"/>
            </paths>
    </cp:conditions>
    <cp:actions>
        <allow-forwarding>true</allow-forwarding>
    </cp:actions>
    </cp:rule>
<cp:rule cp:id="a2">
    <cp:conditions>
        <non-receipt>
            <identity>
                <one uri="david@example.com"/>
                <one uri="tom@example.com"/>
            </identity>
        </non-receipt>
        <paths>
            <path id="group/listservice/list"/>
            <path id="group/listservice/subject"/>
            <path id="group/listservice/schedule"/>
        </paths>
    </cp:conditions>
    <cp:actions>
        <allow-forwarding>true</allow-forwarding>
    </cp:actions>
    </cp:rule>
</cp:ruleset>
</document-rule>
```

(2) The forwarding right for the user B is set in the rights document of the user A, but the forwarding receiver is not individually set for the user B; however, as the document content in the XDM is forwarded in the XDMS, when the user B sends a forwarding request, the XDMS may acquire, in the rights document, whether the user C has a right to access the document content, that is, the forwarding receiver is considered as an acquiring party of the document; if the user C has the right to access the document content, the document content is forwarded to the user C; if the user C does not have the right to access the document content, the XDMS returns a 409 error response to the user B; if the forwarding sender list in the rights document of the user A does not include the user C, the XDMS performs step 203; if the forwarding sender list in the rights document of the user A includes the user C, the XDMS performs step 204.

203: The XDMS returns a 409 user Conflict error response to the user B.

204: The XDMS returns a 200 OK response to the user B and allows the user B to forward a part of the document content of the user A to the user C, and performs step 205.

205: The XDMS forwards the content, to which the user B has the right to forward to the user C, in the document of the user A to the path of the user C in the XDMS.

In the foregoing processing procedure, the access right content of the user B may also be set to include the forwarding content and the access right content of the user C, that is, the user B has the forwarding right to the document, but may have the forwarding right of only a part of the content of the document, so that the user B can forward only the part of the content to which the user B has the forwarding right. If the document content to which the user B has the forwarding right in the rights document of the user A is different from the document content to which the user C has the access right in the rights document of the user A, the XDMS sends the document content to which the user B has the forwarding right and the user C has the access right in the rights document of the user A to the user C.

In the method according to this embodiment of the present invention, the XDMS sets the forwarding right of the forwarding sender and at the same time sets the forwarding receiver to which the forwarding sender can forward the document content, or the XDMS first acquires, in the rights document, whether the forwarding receiver has the right to access the document content when receiving the forwarding request sent by the forwarding sender, so that the forwarding sender can selectively forward the document content to the forwarding receiver according to the rights setting in the access rights document stored in the XDMS, thereby avoiding arbitrary forwarding of the document after the forwarding sender has the forwarding right, and ensuring the confidentiality of the document for the document creator.

Embodiment 3

Figure 3:
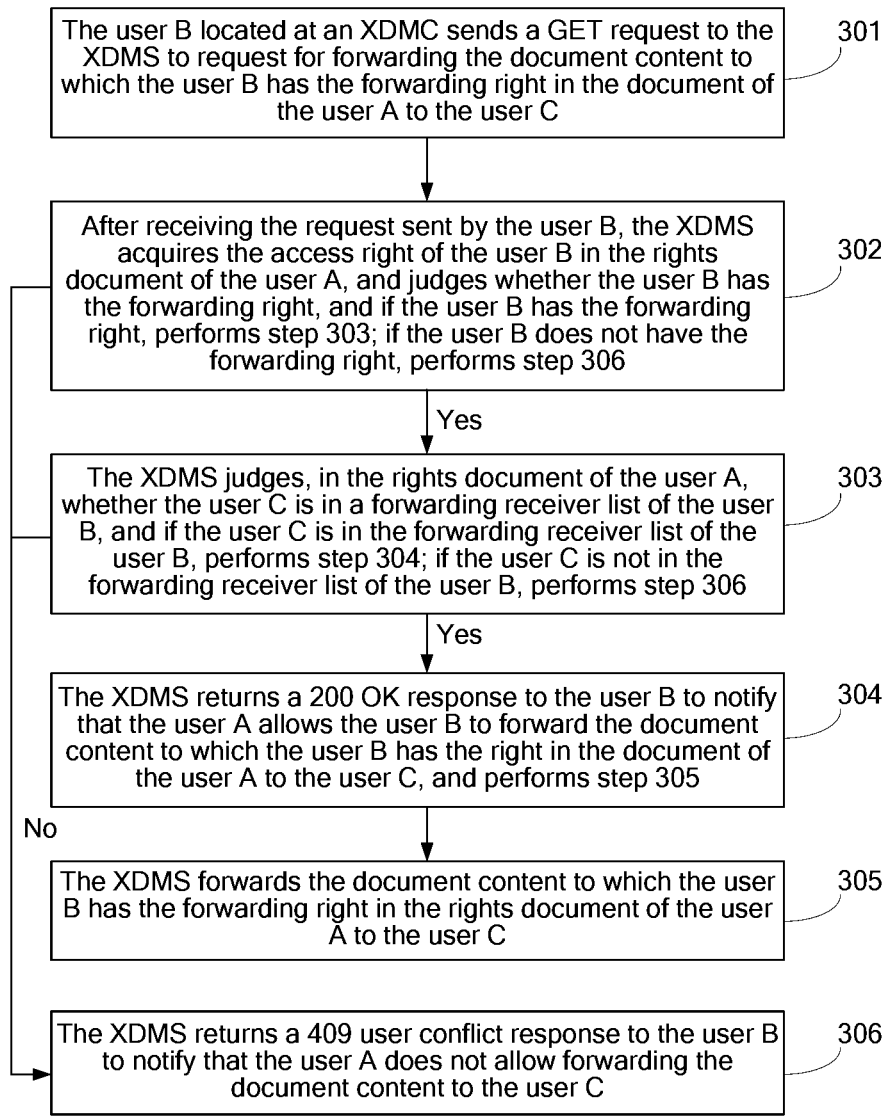
FIG. 3 is a flow chart of a method according to Embodiment 3 of the present invention.

In order to enable a forwarding sender to selectively forward document content to a forwarding receiver according to a rights setting in an access rights document stored in an XDMS, so as to avoid arbitrary forwarding of a document after the forwarding sender has a forwarding right, and ensure confidentiality of the document for a document creator, this embodiment of the present invention provides a method for forwarding document content in XDM. The specific content is as follows:

In this embodiment of the present invention, that a user A is a document management user, a user B is the forwarding sender, and a user C is the forwarding receiver is taken as an example. The user B forwards document content to which the user B has the forwarding right in a rights document of the user A (where the document content is stored in the XDMS) to the user C (where forwarding content is stored in the XDMS), so the user B located at an XDMC sends a request to the XDMS, and judges whether the user C is allowed to access the document according to the forwarding receiver set in a rights document of the user A, and if the user C has the right, the XDMS forwards the content to the user C. Referring to FIG. 3, the specific procedure is as follows:

301: The user B located at the XDMC sends a GET request to the XDMS to request for forwarding the document content to which the user B has the forwarding right in the document of the user A to the user C.

The user B sends the GET request to the XDMS, and the GET request herein merely represents an action of acquiring, which is a parallel operation of modification, deletion, and creation, but not includes a procedure of processing the content.

The user B is located at the XDMC, and the document content of the user A is stored in the XDMS; as the document management user, the user A may be the creator of an XML document, and may also be a special user that is authorized and can modify an access right to the document, so that another user may access the whole document or a part of the content of the document in the XDMS according to the access right set by the user A.

In the request sent by the user B to the XDMS, it is requested to forward the document content to which the user B has the forwarding right in the document of the user A to a directory of the user C in the XDMS, and when the user B has a right of forwarding the whole document content, it may be requested to the user A to forward the whole document content to the user C; additionally, the user B may also forward a part of the content in the document content to which the user B has the forwarding right in the document of the user A to the user C.

302: After receiving the request sent by the user B, the XDMS acquires the access right of the user B in the rights document of the user A, and judges whether the user B has the forwarding right. If the user B has the forwarding right, step 303 is performed; if the user B does not have the forwarding right, step 306 is performed.

303: The XDMS judges, in the rights document of the user A, whether the user C is in a forwarding receiver list of the user B. If the user C is in the forwarding receiver list of the user B, step 304 is performed; if the user C is not in the forwarding receiver list of the user B, step 306 is performed.

In this embodiment of the present invention, in the rights document of the user A, if a user is allowed to has the forwarding right to forward the document content, a corresponding forwarding receiver needs to be set, a forwarding receiver list is established, and all users to which the document content can be forwarded are listed in the list.

304: The XDMS returns a 200 OK response to the user B to notify that the user A allows the user B to forward the document content to which the user B has the right in the document of the user A to the user C, and then performs step 305.

305: The XDMS forwards the document content to which the user B has the forwarding right in the rights document of the user A to the user C.

306: The XDMS returns a 409 user Conflict response to the user B to notify that the user A does not allow forwarding the document content to the user C.

Additionally, when the forwarding receiver to which the user B can forward the document content is set, forwarding times of the user B may also be set to limit the user B; in the foregoing processing procedure, the access right content of the user B may also be set to include the forwarding content and the access right content of the user C, that is, the user B has the forwarding right to the document, but may have the forwarding right of only a part of the content of the document, so that the user B can forward only the part of the content to which the user B has the forwarding right. If the document content to which the user B has the forwarding right in the rights document of the user A is different from the document content to which the user C has the access right in the forwarding receiver list of the user B, the XDMS sends the document content to which the user B has the forwarding right and the user C has the access right in the rights document of the user A to the user C.

In the method according to this embodiment of the present invention, the XDMS sets the forwarding right of the forwarding sender and at the same time sets the access right of the forwarding receiver to which the forwarding sender can forward the document content so that the forwarding sender can selectively forward the document content to the forwarding receiver according to the rights setting in the access rights document stored in the XDMS, thereby avoiding arbitrary forwarding of the document after the forwarding sender has the forwarding right, and ensuring the confidentiality of the document for the document creator.

Embodiment 4

Figure 4:
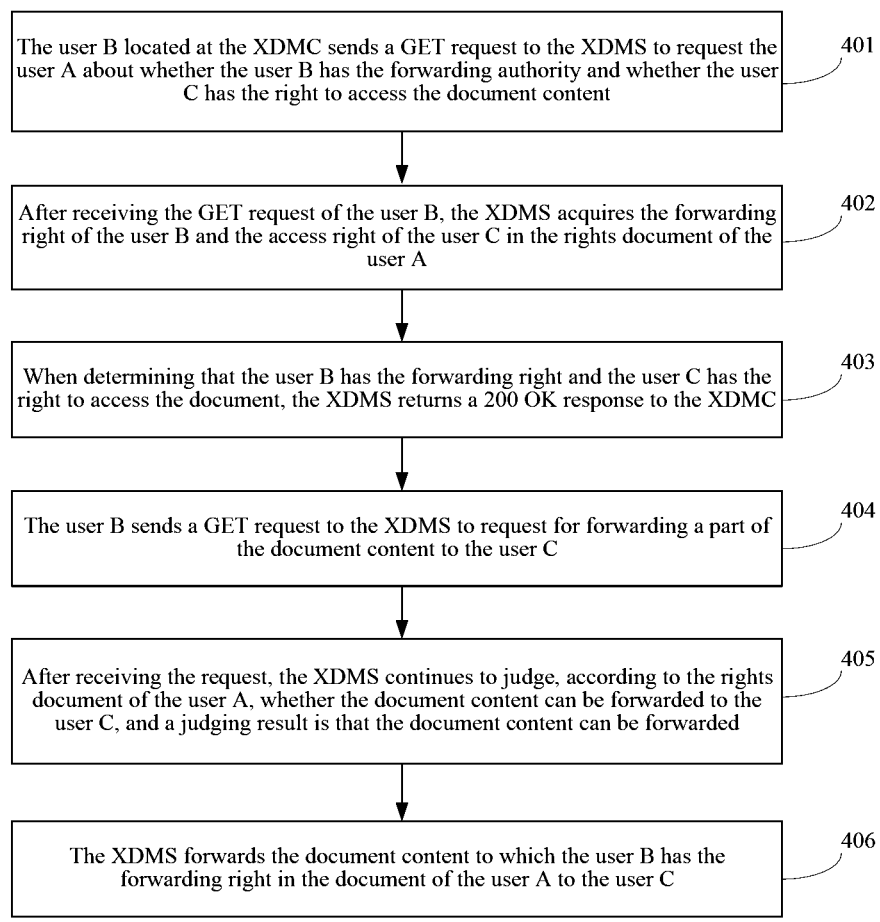
FIG. 4 is a flow chart of a method according to Embodiment 4 of the present invention.

In order to enable a forwarding sender to selectively forward document content to a forwarding receiver according to a rights setting in an access rights document stored in an XDMS, so as to avoid arbitrary forwarding of a document after the forwarding sender has a forwarding right, and ensure confidentiality of the document for a document creator, this embodiment of the present invention provides a method for forwarding document content in XDM. The specific content is as follows:

In this embodiment of the present invention, that a user A is a document management user, a user B is the forwarding sender, and a user C is the forwarding receiver is taken as an example. The user B forwards document content to which the user B has the forwarding right in a rights document of the user A (where the document content is stored in the XDMS) to the user C (where the forwarding content is stored in the XDMS), so the user B located at an XDMC sends a request to the XDMS. In this embodiment of the present invention, a right of the forwarding receiver is not set in the rights document of the user A, but an original forwarding sender list in the rights document is used to judge whether the user C has a right to access the document, so as to judge whether the user B can forward the document to the user C. Referring to FIG. 4, the specific procedure is as follows:

401: The user B located at the XDMC sends a GET request to the XDMS to request the user A about whether the user B has the forwarding right and whether the user C has the right to access the document content.

The user B located at the XDMC sends the GET request to the XDMS, and the GET request herein merely represents an action of acquiring, which is a parallel operation of modification, deletion, and creation, but not includes a procedure of processing the content.

The document content of the user A is stored in the XDMS; as the document management user, the user A may be the creator of an XML document, and may also be a special user that is authorized and can modify an access right to the document, so that another user may access the whole document or a part of the content of the document in the XDMS according to the access right set by the user A.

In the request sent by the user B to the XDMS, it is requested to forward the document content to which the user B has the forwarding right in the document of the user A to a directory of the user C in the XDMS, and when the user B has a right of forwarding the whole document content, it may be requested to the user A to forward the whole document content to the user C; additionally, the user B may also forward a part of the content in the document content to which the user B has the forwarding right in the document of the user A to the user C.

402: After receiving the GET request of the user B, the XDMS acquires the forwarding right of the user B and the access right of the user C in the rights document of the user A.

After receiving the request sent by the user B, the XDMS acquires the rights document of the user A, and judges, according to the rights document of the user A, whether the user B has the forwarding right. When the user B has the forwarding right, as the right of the forwarding receiver of a user having the forwarding right is not set in the rights document, as for the right of the forwarding receiver, the right of the forwarding sender is referenced to judge whether the document content can be forwarded to the forwarding receiver. That is, if an authorized forwarding sender includes a URI of the forwarding receiver C, the forwarding can be performed; however, if the authorized forwarding sender does not include the URI of the forwarding receiver C, the forwarding cannot be performed.

The XDMS acquires the rights document of the user A, and determines, in the rights document, that the user B does not have the forwarding right or the authorized forwarding sender does not include the URI of the forwarding receiver C, returns a 409 user conflict response to the user B to notify that the user A does not allow forwarding the document content to the user C.

403: When determining that the user B has the forwarding right and the user C has the right to access the document, the XDMS returns a 200 OK response to the XDMC.

The user C has the right to access the document, that is, has a right of being forwarded to, and the XDMS returns a 200 OK response to the XDMC, where the response may include the document content forwarded.

404: The user B sends a GET request to the XDMS to request for forwarding a part of the document content to the user C.

405: After receiving the request, the XDMS continuously judges, according to the rights document of the user A, whether the document content can be forwarded to the user C, and a judgment result is that the document can be forwarded.

After receiving the request, the XDMS continuously judges, according to the rights document of the user A, whether the user C has the access right in the rights document of the user A, that is, whether the authorized forwarding sender includes the URI of the forwarding receiver C, and the judgment result is that the forwarding can be performed.

406: The XDMS forwards the document content to which the user B has the forwarding right in the rights document of the user A to the user C.

Additionally, when the forwarding right of the user B is set, forwarding times of the user B may also be set to limit the user B.

In the foregoing processing procedure, the access right content of the user B may also be set to include the forwarding content and the access right content of the user C, that is, the user B has the forwarding right to the document, but may have the forwarding right of only a part of the content of the document, so that the user B can forward only the part of the content to which the user B has the forwarding right. If the document content to which the user B has the forwarding right in the rights document of the user A is different from the document content to which the user C has the access right in the rights document of the user A located at the XDMS, the XDMS sends the document content to which the user B has the forwarding right and the user C has the access right in the rights document of the user A to the user C.

For example, the document content includes three parts, namely, document content 1, document content 2 and document content 3. The document content to which the user B has the forwarding right in the rights document of the user A is the document content 1 and the document content 2, and the document content to which the user C has the access right in the rights document of the user A is the document content 1. After determining, according to the rights document of the user A, that the user B has the forwarding right and the user C has the access right, the XDMS forwards the document content 1 to the user C; although the document content to which the user B has the forwarding right is the document content 1 and the document content 2, as the document content to which the user C has the access right in the rights document of the user A is only the document content 1, the XDMS can forward only the document content 1 to the user C.

Further, for example, the document content includes three parts, namely, document content 1, document content 2 and document content 3. The document content to which the user B has the forwarding right in the rights document of the user A is the document content 2, and the document content to which the user C has the access right in the rights document of the user A is the document content 2 and the document content 3. After determining, according to the rights document of the user A, that the user B has the forwarding right and the user C has the access right, the XDMS forwards the document content 2 to the user C; although the document content to which the user C has the access right is the document content 2 and the document content 3, as the document content to which the user B has the forwarding right is only the document content 2, the XDMS can forward only the document content 2 to the user C.

Further, for example, the document content includes three parts, namely, document content 1, document content 2 and document content 3. The document content to which the user B has the forwarding right in the rights document of the user A is the document content 1, the document content 2 and the document content 3, and the document content to which the user C has the access right in the rights document of the user A is the document content 3. After determining, according to the rights document of the user A, that the user B has the forwarding right and the user C has the access right, the XDMS forwards the document content 3 to the user C; although the document content to which the user B has the forwarding right is the document content 1, the document content 2 and the document content 3, as the document content to which the user C has the access right in the rights document of the user A is only the document content 3, the XDMS can forward only the document content 3 to the user C.

In the method according to this embodiment of the present invention, the XDMS acquires whether the forwarding sender has the forwarding right in the rights document and acquires whether the forwarding receiver has the right to access the document content when receiving a forwarding request sent by the forwarding sender, so that the forwarding sender can selectively forward the document content to the forwarding receiver according to the rights setting in the access rights document stored in the XDMS, thereby avoiding arbitrary forwarding of the document after the forwarding sender has the forwarding right, and ensuring the confidentiality of the document for the document creator.

Embodiment 5

Figure 5:
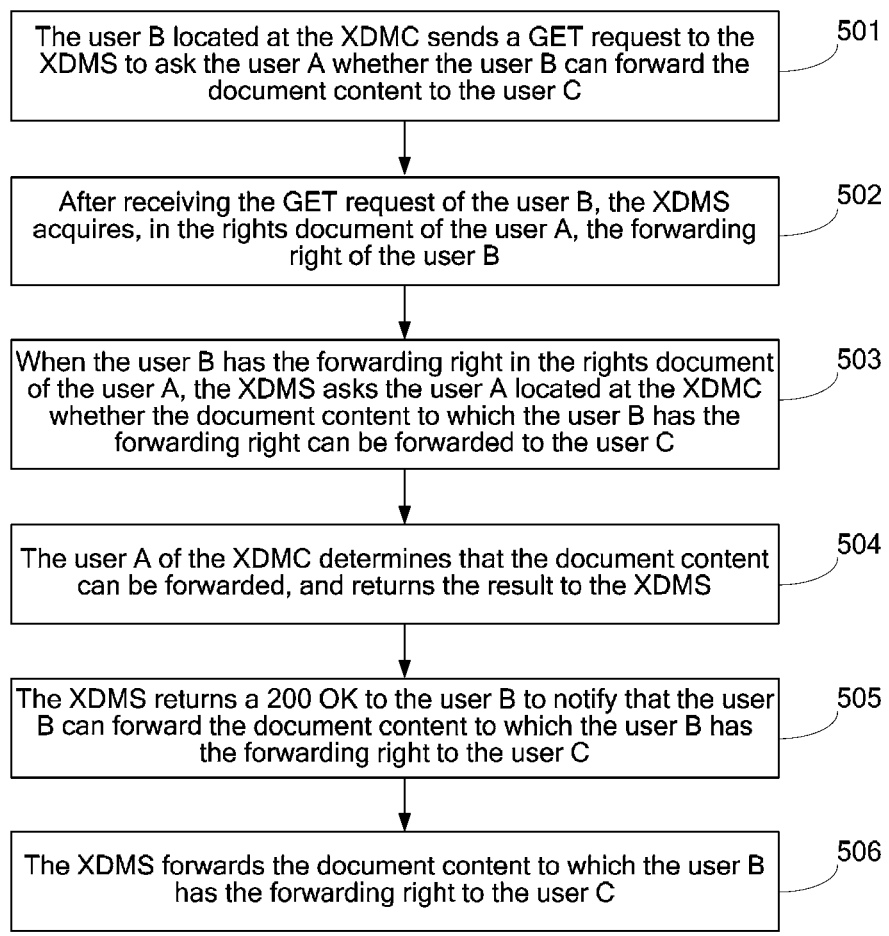
FIG. 5 is a flow chart of a method according to Embodiment 5 of the present invention.

In order to enable a forwarding sender to selectively forward the document content to a forwarding receiver according to a rights setting in an access rights document stored in an XDMS, so as to avoid arbitrary forwarding of a document after the forwarding sender has the forwarding right, and ensure confidentiality of the document for a document creator, this embodiment of the present invention provides a method for forwarding document content in XDM. The specific content is as follows:

In this embodiment of the present invention, that a user A is a document management user, a user B is the forwarding sender, and a user C is the forwarding receiver is taken as an example. The user B forwards document content to which the user B has the forwarding right in a rights document of the user A (where the document content is stored in the XDMS) to the user C (where the forwarding content is all or a part of the document content and is stored in the XDMS), so the user B located at an XDMC sends a request to the XDMS. In this embodiment of the present invention, a right of the forwarding receiver is not set in the rights document of the user A, but the XDMS requires that when intending to forward the document content, a user having the forwarding right needs to ask the document management user A whether the forwarding receiver has a right to receive the document content. If the forwarding receiver has the right, the document content is sent; if the forwarding receiver does not have the right, an error is returned to the forwarding sender B and it is not allowed to send the document content. Referring to FIG. 5, the specific procedure is as follows:

501: The user B located at the XDMC sends a GET request to the XDMS to ask the user A whether the user B can forward the document content to the user C.

The user B located at the XDMC sends the GET request to the XDMS, and the GET request herein merely represents an action of acquiring, which is a parallel operation of modification, deletion, and creation, but not includes a procedure of processing the content.

The document content of the user A is stored in the XDMS; as the document management user, the user A may be the creator of an XML document, and may also be a special user that is authorized and can modify an access right to the document, so that another user can access the whole document or a part of the content of the document in the XDMS according to the access right set by the user A.

In the request by the user B sent to the XDMS, it is requested to forward the document content to which the user B has the forwarding right in the document of the user A to a directory of the user C in the XDMS, and when the user B has a right of forwarding the whole document content, it may be requested to the user A to forward the whole document content to the user C; additionally, the user B may also forward a part of the content in the document content to which the user B has the forwarding right in the document of the user A to the user C.

502: After receiving the GET request of the user B, the XDMS acquires the forwarding right of the user B in the rights document of the user A.

After receiving the request sent by the user B, the XDMS acquires the rights document of the user A, judges, according to the rights document of the user A, whether the user B has the forwarding right, and when the user B has the forwarding right, performs step 503.

The XDMS acquires the rights document of the user A, if it is determined that the user B does not have the forwarding right in the rights document, returns a 409 user conflict response to the user B to notify that the user A does not allow forwarding the document content to the user C.

503: When the user B has the forwarding right in the rights document of the user A, the XDMS asks the user A located at the XDMC whether the document content to which the user B has the forwarding right can be forwarded to the user C.

The right of the forwarding receiver is not set in the rights document of the user A, but the XDMS requires that when intending to forward the document content, the user having the forwarding right needs to ask the document management user A whether the forwarding receiver C has the right to receive the document content.

504: The user A of the XDMC determines that the document can be forwarded, and returns the result to the XDMS.

When receiving an asking request sent by the XDMC, the user A of the XDMC judges whether the document content to which the user B has the forwarding right in the rights document of the user A can be forwarded to the user C, and if the user C has the right to receive the document content, the document content can be forwarded; if the user C does not have the right to receive the document content, an error is returned to the forwarding sender B and it is not allowed to send the document content.

505: The XDMS returns a 200 OK to the user B to notify the user B that the document content to which the user B has the forwarding right can be forwarded to the user C.

506: The XDMS forwards the document content to which the user B has the forwarding right to the user C.

Additionally, when the forwarding right of the user B is set, forwarding times of the user B may also be set to limit the user B.

In the foregoing processing procedure, the access right content of the user B may also be set to include the forwarding content and the access right content of the user C in the rights document of the user A located at the XDMC, that is, the user B has the forwarding right to the document, but may have the forwarding right of only a part of the content of the document, so that the user B can forward only the part of the content to which the user B has the forwarding right. If the document content to which the user B has the forwarding right in the rights document of the user A is different from the document content to which the user C has the access right in the user A located at the XDMC, the XDMS sends the document content to which the user B has the forwarding right in the rights document of the user A located at the XDMS and the user C has the access right in the user A located at the XDMC to the user C.

For example, the document content includes three parts, namely, document content 1, document content 2 and document content 3. The document content to which the user B has the forwarding right in the rights document of the user A is the document content 1 and the document content 2, and the document content to which the user C has the access right in the user A located at the XDMC is the document content 1. After determining, according to the rights document of the user A, that the user B has the forwarding right and the user C has the access right in the user A located at the XDMC, the XDMS forwards the document content 1 to the user C; although the document content to which the user B has the forwarding right is the document content 1 and the document content 2, as the document content to which the user C has the access right in the user A located at the XDMC is only the document content 1, the XDMS can forward only the document content 1 to the user C.

Further, for example, the document content includes three parts, namely, document content 1, document content 2 and document content 3. The document content to which the user B has the forwarding right in the rights document of the user A is the document content 2, and the document content to which the user C has the access right in the user A located at the XDMC is the document content 2 and the document content 3. After determining, according to the rights document of the user A, that the user B has the forwarding right and the user C has the access right in the user A located at the XDMC, the XDMS forwards the document content 2 to the user C; although the document content to which the user C has the access right in the user A located at the XDMC is the document content 2 and the document content 3, as the document content to which the user B has the forwarding right is only the document content 2, the XDMS can forward only the document content 2 to the user C.

Further, for example, the document content includes three parts, namely, document content 1, document content 2 and document content 3. The document content to which the user B has the forwarding right in the rights document of the user A is the document content 1, the document content 2 and the document content 3, and the document content to which the user C has the access right in the user A located at the XDMC is the document content 3. After determining, according to the rights document of the user A, the user B has the forwarding right and the user C has the access right in the user A located at the XDMC, the XDMS forwards the document content 3 to the user C; although the document content to which the user B has the forwarding right is the document content 1, the document content 2 and the document content 3, as the document content to which the user C has the access right in the user A located at the XDMC is only the document content 3, the XDMS can forward only the document content 3 to the user C.

In the method according to this embodiment of the present invention, the XDMS acquires the forwarding right of the forwarding sender and asks the document administrator whether the forwarding receiver has the right to access the document content when receiving a forwarding request sent by the forwarding sender, so that the forwarding sender can selectively forward the document content to the forwarding receiver according to the rights setting in the access rights document stored in the XDMS, thereby avoiding arbitrary forwarding of the document after the forwarding sender has the forwarding right, and ensuring the confidentiality of the document for the document creator.

Embodiment 6

Figure 6:
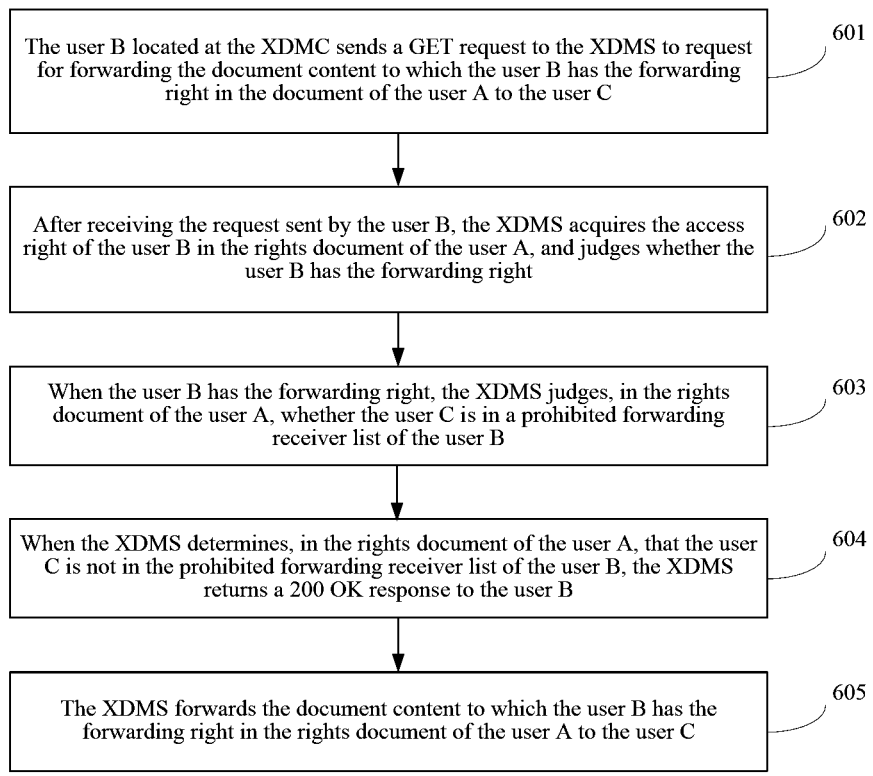
FIG. 6 is a flow chart of a method according to Embodiment 6 of the present invention.

In order to enable a forwarding sender to selectively forward document content to a forwarding receiver according to a rights setting in an access rights document stored in an XDMS, so as to avoid arbitrary forwarding of a document after the forwarding sender has a forwarding right, and ensure confidentiality of the document for a document creator, this embodiment of the present invention provides a method for forwarding document content in XDM. The specific content is as follows:

In this embodiment of the present invention, that a user A is a document management user, a user B is the forwarding sender, and a user C is the forwarding receiver is taken as an example. The user B forwards document content to which the user B has the forwarding right in a rights document of the user A (where the document content is stored in the XDMS) to the user C (where the forwarding content is stored in the XDMS), so the user B located at an XDMC sends a request to the XDMS, and judges, according to a prohibited receiver that is set in the rights document of the user A, whether the user C is not allowed to access the document content. If the user C is not allowed to access the document content, the XDMS does not forward the document content to the user C, and returns an error response to the user B. In this embodiment, in the rights document of the user A, if a user is allowed to forward the document content, a prohibited forwarding receiver, forwarding times, and the forwarding content need to be set. Referring to FIG. 6, the specific procedure is as follows:

601: The user B located at the XDMC sends a GET request to the XDMS to request for forwarding the document content to which the user B has the forwarding right in the document of the user A to the user C.

The user B sends the GET request to the XDMS, and the GET request herein merely represents an action of acquiring, which is a parallel operation of modification, deletion, and creation, but not includes a procedure of processing the content.

The user B is located at the XDMC, and the document content of the user A is stored in the XDMS; as the document management user, the user A may be the creator of an XML document, and may also be a special user that is authorized and can modify an access right to the document, so that another user may access the whole document or a part of the content of the document in the XDMS according to the access right set by the user A.

In the request sent by the user B to the XDMS, it is requested to forward the document content to which the user B has the forwarding right in the document of the user A to a directory of the user C in the XDMS, and when the user B has a right of forwarding the whole document content, it may be requested to the user A to forward the whole document content to the user C; additionally, the user B may also forward a part of the content in the document content to which the user B has the forwarding right in the document of the user A to the user C.

602: After receiving the request sent by the user B, the XDMS acquires the access right of the user B in the rights document of the user A, and judges whether the user B has the forwarding right.

When the XDMS determines that the user B does not have the forwarding right in the rights document of the user A, the XDMS returns a 409 user conflict response to the user B to notify that the user A does not allow forwarding the document content to the user C.

603: When the user B has the forwarding right, the XDMS judges, in the rights document of the user A, whether the user C is in a prohibited forwarding receiver list of the user B.

In this embodiment of the present invention, in the rights document of the user A, if a user is allowed to has the forwarding right to forward the document content, a corresponding prohibited forwarding receiver needs to be set, a prohibited forwarding receiver list is established, and all users to which it is not allowed to forward the document content are listed in the list.

When the XDMS determines, in the rights document of the user A, that the user C is in the prohibited forwarding receiver list of the user B, the XDMS returns a 409 user conflict response to the user B to notify that the user A does not allow forwarding the document content to the user C.

604: When the XDMS determines, in the rights document of the user A, that the user C is not in the prohibited forwarding receiver list of the user B, the XDMS returns a 200 OK response to the user B to notify that the user A allow the user B to forward the document content to which the user B has the right in the document of the user A to the user C.

605: The XDMS forwards the document content to which the user B has the forwarding right in the rights document of the user A to the user C.

When a forwarding receiver to which the user B is not allowed to forward the document content is set, forwarding times of the user B may also be set to limit the user B. In the foregoing processing procedure, the access right content of the user B may also be set to include the forwarding content, that is, that the user B has the forwarding right to the document.

In the method according to this embodiment of the present invention, the XDMS sets the forwarding right of the forwarding sender and at the same time sets the prohibited forwarding receiver to which the forwarding sender is not allowed to forward the document content, so that the forwarding sender can selectively forward the document content to the forwarding receiver according to the rights setting in the access rights document stored in the XDMS, thereby avoiding arbitrary forwarding of the document after the forwarding sender has the forwarding right, and ensuring the confidentiality of the document for the document creator.

Embodiment 7

Figure 7:
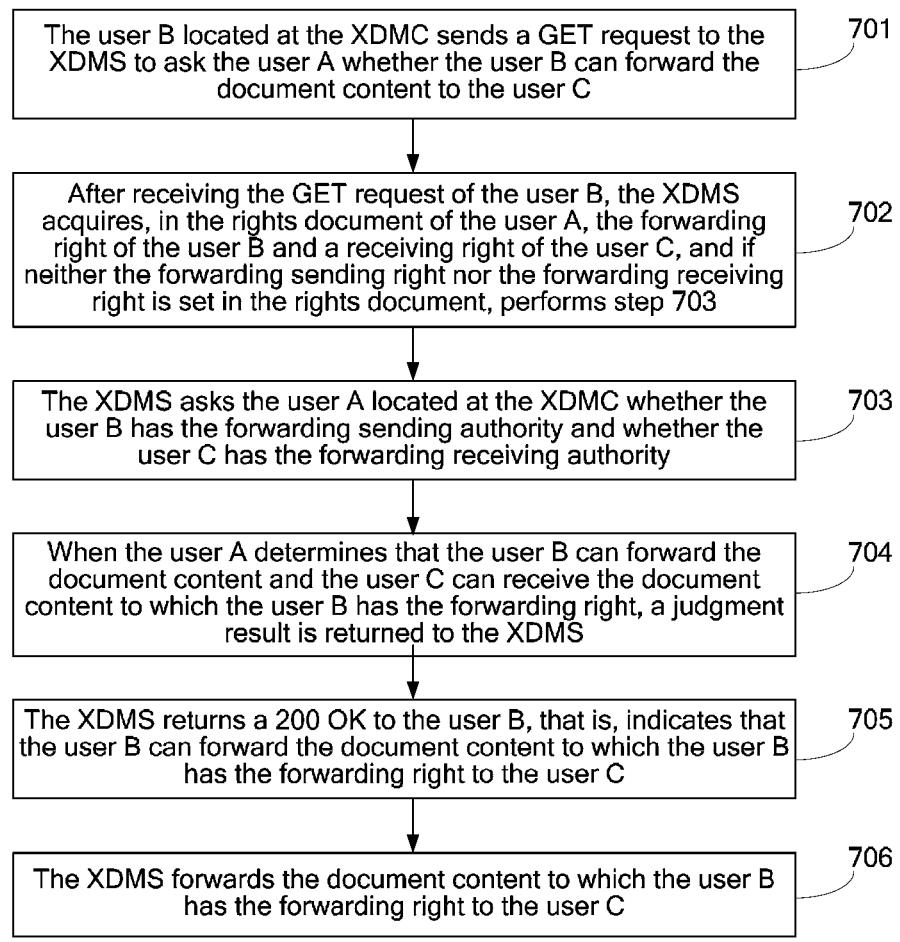
FIG. 7 is a flow chart of a method according to Embodiment 7 of the present invention.

In order to enable a forwarding sender to selectively forward document content to a forwarding receiver according to a rights setting in an access rights document stored in an XDMS, so as to avoid arbitrary forwarding of a document after the forwarding sender has a forwarding right, and ensure confidentiality of the document for a document creator, this embodiment of the present invention provides a method for forwarding document content in XDM. The specific content is as follows:

In this embodiment of the present invention, that a user A is a document management user, a user B is the forwarding sender, and a user C is the forwarding receiver is taken as an example. The user B forwards document content to which the user B has the forwarding right in a rights document of the user A (where the document content is stored in the XDMS) to the user C (where the forwarding content is stored in the XDMS), so the user B located at an XDMC sends a request to the XDMS. In this embodiment, in the rights document of the user A, a right of the forwarding sender is not set, nor a right of the forwarding receiver. However, when a user sends a request to the XDMS to request for forwarding a part of the document content, the user needs to ask the document creator or the document administrator whether the forwarding sender can forward the part of the document content and whether the forwarding receiver has a right to receive the document content, and if the forwarding sender and the forwarding receiver both have the rights, the document content can be sent; if the forwarding sender or the forwarding receiver does not have the right, an error is returned to a document acquiring party and it is not allowed to send the document content. Referring to FIG. 7, the specific procedure is as follows:

701: The user B located at the XDMC sends a GET request to the XDMS to ask the user A whether the user B can forward the document content to the user C.

The user B located at the XDMC sends the GET request to the XDMS, and the GET request herein merely represents an action of acquiring, which is a parallel operation of modification, deletion, and creation, but not includes a procedure of processing the content.

The document content of the user A is stored in the XDMS; as the document management user, the user A may be the creator of an XML document, and may also be a special user that is authorized and can modify an access right to the document, so that another user may access the whole document or a part of the content of the document in the XDMS according to the access right set by the user A.

In the request sent by the user B to the XDMS, it is requested to forward the document content to which the user B has the forwarding right in the document of the user A to a directory of the user C in the XDMS, and when the user B has a right of forwarding the whole document content, it may be requested to the user A to forward the whole document content to the user C; additionally, the user B may also forward a part of the content in the document content to which the user B has the forwarding right in the document of the user A to the user C.

702: After receiving the GET request of the user B, the XDMS acquires, in the rights document of the user A, the forwarding right of the user B and a receiving right of the user C. If neither the forwarding sending right nor the forwarding receiving right is set in the rights document, step 703 is performed.

After receiving the request sent by the user B, the XDMS acquires the rights document of the user A, and judges whether the rights document of the user A has the forwarding right of the user B and the receiving right of the user C. If neither the forwarding sending right nor the forwarding receiving right is set in the rights document, step 703 is performed.

703: The XDMS asks the user A located at the XDMC whether the user B has the forwarding sending right and whether the user C has the forwarding receiving right.

Neither the right of the forwarding sender nor the right of the forwarding receiver is set in the rights document of the user A; therefore, the XDMS needs to ask the document management user A whether the user B has the forwarding right and whether the forwarding receiver C has the right to receive the document content.

704: When the user A determines that the user B can forward the document content and the user C can receive the document content to which the user B has the forwarding right, a judgment result is returned to the XDMS.

When the user A determines that the user B cannot forward the document content, or the user C cannot receive the document content to which the user B has the forwarding right, a determination result is also returned to the XDMS. After receiving the determination result, the XDMS returns a 409 user conflict response to the user B to notify that the user A does not allow forwarding the document content to the user C.

705: The XDMS returns a 200 OK to the user B, that is, indicates that the user B can forward the document content to which the user B has the forwarding right to the user C.

706: The XDMS forwards the document content to which the user B has the forwarding right to the user C.

In the foregoing processing procedure, the access right content of the user B may also be set to include the forwarding content, that is, the user B has the forwarding right to the document, but may have the forwarding right of only a part of the content of the document, so that the user B can forward only the part of the content to which the user B has the forwarding right.

In the method according to this embodiment of the present invention, after receiving a forwarding request of the forwarding sender, the XDMS sends an asking request to the document administrator to ask whether the forwarding sender has the forwarding right and whether the forwarding receiver has the access right, so that the forwarding sender can selectively forward the document content to the forwarding receiver, thereby avoiding arbitrary forwarding of the document after the forwarding sender has the forwarding right, and ensuring the confidentiality of the document for the document creator.

Embodiment 8

Figure 8:
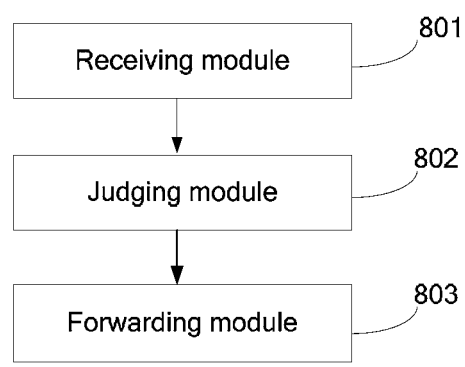
FIG. 8 is a schematic structural diagram of a device according to Embodiment 8 of the present invention.
Figure 9:
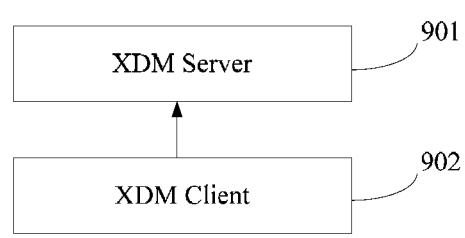
FIG. 9 is a schematic structural diagram of a system according to Embodiment 9 of the present invention.

This embodiment of the present invention provides an XDMS device. Referring to FIG. 8, the device includes:
  a receiving module 801, configured to receive a forwarding request sent by a forwarding sender, where the forwarding request is used to forward the document content to a forwarding receiver;
  a judging module 802, configured to judge, according to a rights document, whether the forwarding sender has a forwarding right to the document content and whether the forwarding receiver has an access right to the document content; and a forwarding module 803, configured to forward the document content to the forwarding receiver when the forwarding sender has the forwarding right and the forwarding receiver has the access right.

The device further includes at least any one of the following modules:

a first setting module, configured to set, in the rights document, the forwarding right of the forwarding sender, and set a forwarding receiver list for the forwarding sender;

a second setting module, configured to set, in the rights document, the forwarding right of the forwarding sender, and set, in the rights document, the access right of the forwarding receiver;

a third setting module, configured to set, in the rights document, the forwarding right of the forwarding sender; and a fourth setting module, configured to set, in the rights document, the forwarding right of the forwarding sender, and set a prohibited forwarding receiver list of the forwarding sender.

Furthermore, if the device includes the first setting module, the first setting module further includes:

a first setting unit, configured to set the document content to which the forwarding sender has the forwarding right and set received document content of the forwarding receiver, where the received document content is a part of the document content or the whole document content to which the forwarding sender has the forwarding right, and the forwarding module 803 forwards the received document content to the forwarding receiver.

Accordingly, the judging module 802 specifically includes:

a first judging forwarding unit, configured to acquire, from the rights document, the access right of the forwarding sender to the document content, and judge whether the forwarding sender has the forwarding right to the document content;

a first judging access unit, configured to judge whether the forwarding receiver is in the forwarding receiver list of the forwarding sender when the forwarding sender has the forwarding right, and if the forwarding receiver is in the forwarding receiver list, forward the access right of the forwarding receiver to the document content.

If the device includes the second setting module, the second setting module further includes:

a second setting unit, configured to set the document content to which the forwarding sender has the forwarding right and set the document content to which the forwarding receiver has the access right, so that the forwarding module 803 forwards the document content to which the forwarding sender has the forwarding right and the forwarding receiver has the access right to the forwarding receiver.

Accordingly, the judging module 802 specifically includes:

a second judging forwarding unit, configured to acquire, from the rights document, the access right of the forwarding sender to the document content, and judge whether the forwarding sender has the forwarding right to the document content; and a second judging access unit, configured to judge, when the forwarding sender has the forwarding right, whether the access right of the forwarding receiver is set in the rights document, and if the access right of the forwarding receiver is set in the rights document, forward the access right of the forwarding receiver to the document content.

If the device includes the third setting module, the third setting module further includes:

a third setting unit, configured to set the document content to which the forwarding sender has the forwarding right, so that the forwarding module 803 forwards the document content to which the forwarding sender has the forwarding right to the forwarding receiver.

Accordingly, the judging module 802 specifically includes:

a third judging forwarding unit, configured to acquire, from the rights document, the access right of the forwarding sender to the document content, and judge whether the forwarding sender has the forwarding right to the document content; and a third judging access unit, configured to send, when the forwarding sender has the forwarding right, an asking request to an XDMC of a document management user to ask whether the forwarding receiver has the access right to the document content; receive an asking result returned by the XDMC of the document management user, where when the asking result is yes, the forwarding receiver has the access right to the document content.

If the device includes the fourth setting module, the fourth setting module further includes:

a fourth setting unit, configured to set the document content to which the forwarding sender has the forwarding right, so that the forwarding module 803 forwards the document content to which the forwarding sender has the forwarding right to the forwarding receiver.

The judging module 802 further includes:

a judging unit, configured to acquire, in the rights document, the forwarding right of the forwarding sender after receiving the forwarding request sent by the receiving module 801, if the forwarding right of the forwarding sender does not exit in the rights document, send an asking request to the XDMC of the document management user to ask whether the forwarding sender has the forwarding right to the document content and whether the forwarding receiver has the access right to the document content; and receive an asking result returned by the XDMC of the document management user.

Accordingly, the forwarding module 803 further includes:

a forwarding unit, configured to forward the document content to which the forwarding sender has the forwarding right to the forwarding receiver when the asking result returned by the judging unit is that the forwarding sender has the forwarding right to the document content and the forwarding receiver has the access right to the document content.

In the device according to this embodiment of the present invention, the XDMS sets the forwarding right of the forwarding sender and at the same time sets the access right of the forwarding receiver, or the XDMS asks the document management user the forwarding right of the forwarding sender and the access right of the forwarding receiver after receiving the forwarding request sent by the forwarding sender, so that the forwarding sender can selectively forward the document content to the forwarding receiver, thereby avoiding arbitrary forwarding of a document after the forwarding sender has the forwarding right, and ensuring confidentiality of the document for a document creator.

Embodiment 9

This embodiment of the present invention provides a system for forwarding document content in XDM. Referring to FIG. 7, the system includes an XDMS 901 and an XDMC 902.

The XDMS 901 is configured to receive a forwarding request sent by a forwarding sender, where the forwarding request is used to forward the document content to a forwarding receiver; judge, according to a rights document, whether the forwarding sender has a forwarding right to the document content and whether the forwarding receiver has an access right to the document content; and when the forwarding sender has the forwarding right and the forwarding receiver has the access right, forward the document content to the forwarding receiver.

The XDMC 902 is configured to send the forwarding request to the XDMS 901, where the forwarding request is used to forward the document content to the forwarding receiver.

The XDMS 901 is further configured to set the forwarding right for the forwarding sender in the rights document, and set a forwarding receiver list for the forwarding sender, where the forwarding receiver list includes all users that can receive the document content forwarded by the forwarding sender.

Furthermore, the XDMS 901 is specifically configured to:

Acquire, from the rights document, the access right of the forwarding sender to the document content, and judge whether the forwarding sender has the forwarding right to the document content; and judge whether the forwarding receiver is in the forwarding receiver list of the forwarding sender when the forwarding sender has the forwarding right, and if the forwarding receiver is in the forwarding receiver list, forward the access right of the forwarding receiver to the document content.

Furthermore, the XDMS 901 is further configured to set the document content to which the forwarding sender has the forwarding right and the received document content of the forwarding receiver, where the received document content is a part of the document content or the whole document content to which the forwarding sender has the forwarding right.

Furthermore, the XDMS 901 is configured to forward the received document content to the forwarding receiver.

The XDMS 901 is further configured to set, in the rights document, the forwarding right for the forwarding sender, and set, in the rights document, the access right for the forwarding receiver.

Furthermore, the XDMS 901 is specifically configured to: acquire, from the rights document, the access right of the forwarding sender to the document content, and judge whether the forwarding sender has the forwarding right to the document content; and judge whether the access right of the forwarding receiver is set in the rights document when the forwarding sender has the forwarding right, and if the access right of the forwarding receiver is set in the rights document, forward the access right of the forwarding receiver to the document content.

Furthermore, the XDMS 901 is further configured to set the document content to which the forwarding sender has the forwarding right and the document content to which the forwarding receiver has the access right.

Furthermore, the XDMS 901 is configured to forward the document content to which the forwarding sender has the forwarding right and the forwarding receiver has the access right to the forwarding receiver.

The XDMS 901 is further configured to set, in the rights document, the forwarding right for the forwarding sender.

Furthermore, the XDMS 901 is specifically configured to:
acquire, in the rights document, the access right of the forwarding sender to the document content, and judge whether the forwarding sender has the forwarding right to the document content;

when the forwarding sender has the forwarding right, send an asking request to the XDMC 902 of a document management user to ask whether the forwarding receiver has the access right to the document content; and receive an asking result returned by the XDMC 902 of the document management user, where when the asking result is yes, the forwarding receiver has the access right to the document content.

Furthermore, the XDMS 901 is further configured to set the document content to which the forwarding sender has the forwarding right.

Furthermore, the XDMS 901 is configured to forward the document content to which the forwarding sender has the forwarding right to the forwarding receiver.

The XDMS 901 is further configured to set, in the rights document, the forwarding right of the forwarding sender, and set a prohibited forwarding receiver list of the forwarding sender.

Furthermore, the XDMS 901 is further configured to set the document content to which the forwarding sender has the forwarding right, and forward the document content to which the forwarding sender has the forwarding right to the forwarding receiver.

The XDMS 901 is further configured to send, after receiving the forwarding request sent by a receiving module, an asking request to the XDMC of the document management user to ask whether the forwarding sender has the forwarding right to the document content and whether the forwarding receiver has the access right to the document content; receive an asking result returned by the XDMC of the document management user; and when the asking result returned by a judging unit is that the forwarding sender has the forwarding right to the document content and the forwarding receiver has the access right to the document content, the forwarding sender forwards the document content to which the forwarding sender has the forwarding right to the forwarding receiver.

In the system according to this embodiment of the present invention, the XDMS sets the forwarding right of the forwarding sender and at the same time sets the access right of the forwarding receiver, or the XDMS acquires whether the forwarding receiver has the right to access the document content when receiving the forwarding request sent by the forwarding sender, so that the forwarding sender can selectively forward the document content to the forwarding receiver according to a rights setting in an access rights document stored in the XDMS, thereby avoiding arbitrary forwarding of a document after the forwarding sender has the forwarding right, and ensuring confidentiality of the document for a document creator.

Persons of ordinary skill in the art should understand that all or a part of the steps of the methods according to the embodiments of the present invention may be implemented by a program instructing relevant hardware. The program may be stored in a computer readable storage medium. When the program is run, the steps of the methods according to the embodiments of the present invention are performed. The storage medium includes any medium that is capable of storing a program code, such as a Read-Only Memory (ROM), a Random Access Memory (RAM), a magnetic disk, and a Compact Disk-Read Only Memory (CD-ROM).

The preceding descriptions are merely embodiments of the present invention, but not intended to limit the present invention. Any modification, equivalent replacement, or improvement made without departing from the spirit and principle of the present invention should fall within the protection scope of the present invention.

What is claimed is:

1. A method for forwarding Extensible Markup Language Document Management (XDM) resource, the method comprising:
    setting in an access permission document, by an Extensible Markup Language Document Management (XDM) device, a forwarding permission of a forwarding sender for allowing the sending of a forwarded XDM resource;
    setting, by the XDM device, a forwarding recipient list for allowing receipt of the forwarded XDM resource, including extending a child element under a forwarding operation element in an action element, wherein the extended child element is used to set the forwarding recipient list;
    receiving, by the XDM device, a forwarding request sent by the forwarding sender, wherein the forwarding request is used to forward the XDM resource to a forwarding recipient;
    judging, by the XDM device, according to the access permission document, whether the forwarding sender has the forwarding permission to the XDM resource and whether the forwarding recipient has an access permission to the XDM resource; and
    when the forwarding sender has the forwarding permission and the forwarding recipient has the access permission, forwarding, by the XDM device, the XDM resource to the forwarding recipient.

2. The method according to claim 1, wherein the method further comprises: setting, in the access permission document, a prohibited forwarding recipient list.

3. The method according to claim 2, wherein the setting the prohibited forwarding recipient list comprises: extending a child element under a forwarding operation element in an action element, wherein the extended child element is used to set the prohibited forwarding recipient list.

4. The method according to claim 1, wherein
    the setting, in the access permission document, the forwarding permission of the forwarding sender further comprises:
    setting XDM resource to which the forwarding sender has the forwarding permission, and setting received XDM resource of the forwarding recipient, wherein the received XDM resource comprises a part of the XDM resource or the whole XDM resource to which the forwarding sender has the forwarding permission.

5. The method according to claim 4, wherein
    the judging, according to the access permission document, whether the forwarding sender has the forwarding permission to the XDM resource and whether the forwarding recipient has the access permission to the XDM resource further comprises:
    acquiring, from the access permission document, the access permission of the forwarding sender to the XDM resource, and judging whether the forwarding sender has the forwarding permission to the XDM resource.

6. The method according to claim 1, wherein the method further comprises:
    setting the XDM resource to which the forwarding sender has the forwarding permission and setting the XDM resource to which the forwarding recipient has the access permission.

7. The method according to claim 1, wherein the judging, according to the access permission document, whether the forwarding sender has the forwarding permission to the XDM resource and whether the forwarding recipient has the access permission to the XDM resource further comprises:
    after receiving the forwarding request sent by the forwarding sender, acquiring, in the access permission document, the forwarding permission of the forwarding sender, if the forwarding permission of the forwarding sender does not exist in the access permission document, sending an asking request to an XDM Client (XDMC) of a document management user to ask whether the forwarding sender has the forwarding permission to the XDM resource and whether the forwarding recipient has the access permission to the XDM resource; and
    receiving an asking result returned by the XDMC of the document management user.

8. An Extensible Markup Language Document Management (XDM) server (XDMS) device comprising a processor and a non-transitory processor-readable medium having processor-executable instructions stored thereon, wherein the processor is configured to execute the instructions stored in the non-transitory computer readable medium to:
    receive a forwarding request sent by a forwarding sender, wherein the forwarding request is used to forward the XDM resource to a forwarding recipient;
    judge according to a access permission document, whether the forwarding sender has a forwarding permission to the XDM resource and whether the forwarding recipient has an access permission to the XDM resource; and
    forward the XDM resource to the forwarding recipient when the forwarding sender has the forwarding permission and the forwarding recipient has the access permission;
    set in the access permission document, the forwarding permission of the forwarding sender for allowing the sending of the forwarded XDM resource; and
    set a forwarding recipient list for allowing receipt of the forwarded XDM resource;
    wherein setting the forwarding recipient list comprises extending a child element under a forwarding operation element in an action element, wherein the extended child element is used to set the forwarding recipient list.

9. The device according to claim 8, wherein the processor further configured to:
    set, in the access permission document, the forwarding permission of the forwarding sender, and set a forwarding recipient list;
    set, in the access permission document, the forwarding permission of the forwarding sender, and set, in the access permission document, the access permission of the forwarding recipient;
    set, in the access permission document, the forwarding permission of the forwarding sender; and set, in the access permission document, the forwarding permission of the forwarding sender, and set a prohibited forwarding recipient list.

10. The device according to claim 9, wherein the processor further configured to set an XDM resource to which the forwarding sender has the forwarding permission and set a received XDM resource of the forwarding recipient, wherein the received XDM resource comprises a part of the XDM resource or the whole XDM resource to which the forwarding sender has the forwarding permission.

11. The device according to claim 9, wherein the processor further configured to set the XDM resource to which the forwarding sender has the forwarding permission and set an XDM resource to which the forwarding recipient has the access permission.

12. The device according to claim 9, wherein the processor further configured to set the XDM resource to which the forwarding sender has the forwarding permission.

13. The device according to claim 9, wherein the processor further configured to
set the XDM resource to which the forwarding sender has the forwarding permission.

14. The device according to claim 8, wherein the processor further configured to:
acquire, in the access permission document, the forwarding permission of the forwarding sender after receiving the forwarding request sent by the receiving module, if the forwarding permission of the forwarding sender does not exist in the access permission document, send an asking request to an XDM Client (XDMC) of a document management user to ask whether the forwarding sender has the forwarding permission to the XDM resource and whether the forwarding recipient has the access permission to the XDM resource; and
receive an asking result returned by the XDMC of the document management user;
forward the XDM resource to which the forwarding sender has the forwarding permission to the forwarding recipient when the asking result returned by the judging unit is that the forwarding sender has the forwarding permission to the XDM resource and the forwarding recipient has the access permission to the XDM resource.

15. A non-transitory computer-readable medium having computer usable instructions stored thereon for execution by a processor, wherein the instructions cause the processor to:
set in an access permission document a forwarding permission of a forwarding sender for allowing the sender to send the a forwarded XDM content;
set a forwarding recipient list for allowing receipt of the forwarded XDM content, including extending a child element under a forwarding operation element in an action element, wherein the extended child element sets the forwarding recipient;
receive a forwarding request sent by the forwarding sender, wherein the forwarding request is used to forward the XDM content to a forwarding recipient;
judge, according to the access permission document, whether the forwarding sender has a forwarding permission to the XDM content and whether the forwarding recipient has an access permission to the XDM content; and
when the forwarding sender has the forwarding permission and the forwarding recipient has the access permission, forwarding the XDM content to the forwarding recipient.

16. The non-transitory computer-readable medium according to claim 15, wherein the instructions further cause the processor to set, in the access permission document, a prohibited forwarding recipient list.

17. The non-transitory computer-readable medium according to claim 16, wherein the instructions further cause the processor to extend a child element under a forwarding operation element in an action element, wherein the extended child element is used to set the prohibited forwarding recipient list.

18. The non-transitory computer-readable medium according to claim 15, wherein the instructions further cause the processor to set the XDM content to which the forwarding sender has the forwarding permission, and set received XDM content of the forwarding recipient, wherein the received XDM content comprises a part of the XDM content or the whole XDM content to which the forwarding sender has the forwarding permission.

* * * * *

UNITED STATES PATENT AND TRADEMARK OFFICE
CERTIFICATE OF CORRECTION

PATENT NO. : 9,690,951 B2  
APPLICATION NO. : 14/498636  
DATED : June 27, 2017  
INVENTOR(S) : Li et al.

Page 1 of 1

It is certified that error appears in the above-identified patent and that said Letters Patent is hereby corrected as shown below:

Column 30, Line 6, "to send the a forwarded XDM content;" should read -- to send a forwarded XDM content; --

Signed and Sealed this  
First Day of May, 2018

Andrei Iancu  
*Director of the United States Patent and Trademark Office*